3,763,279
HIGH IMPACT VINYL CHLORIDE RESIN FORMULATIONS OF IMPROVED CLARITY AND METHOD OF MAKING SAME
Philip C. Kelley, Brecksville, Ohio, assignor to The B. F. Goodrich Company, New York, N.Y.
No Drawing. Filed May 12, 1971, Ser. No. 142,748
Int. Cl. C08f 19/10, 41/12
U.S. Cl. 260—884      4 Claims

ABSTRACT OF THE DISCLOSURE

A method of making high impact vinyl chloride resin formulations comprising two consecutive stages of over-polymerization, the first of which is an over-polymerization in aqueous dispersion which deposits a tough, rubbery, essentially completely-gelled polyacrylate on seed resin particles of insoluble or crosslinked styrene copolymer and, in the second stage, over-polymerization, the rubber-coated first-stage styrene copolymer seed particles are encased in a matrix of hard vinyl chloride resin. The particle size of the styrene copolymer seed resin latex particles is critical, high impact products being obtained only with seed particles averaging about 200 to about 1700 A., more preferably between about 350 A. and about 1300 A. The thickness of the rubbery coating on the seed latex particles resulting from the first stage over-polymerization likewise is critical, high impact products being obtained when such coating is from about 25 to about 500 A. in thickness. A most preferred modification which is not only essentially clear and essentially free of haze but also develops high impact resistance is produced when seed particles of cross-linked styrene copolymer averaging from about 200 to about 800 A. in diameter are given a grafted coating or shell of gelled acrylate from about 25 A. to about 90 A. in thickness and the resulting product then over-polymerized with a hard vinyl chlorde resin. Both grafting and a critically-thin acrylate shell are necessary to produce the clear version of the products of this invention. Grafting is obtained most easily by crosslinking the styrene copolymer seed resin particles with a monomer such as allyl methacrylate containing at least two polymerizable groupings of markedly differing polymerization reactivity with styrene monomer such as to leave at least a few of polymerizable reactive sites on the surface of the seed particles.

RELATED APPLICATIONS

In my copending application, Ser. No. 142,524 of even date herewith, there is disclosed a method of producing blends of a tough, rubbery, high-gelled polyacrylate and a hard vinyl chloride resin which blends develop high impact strength during final processing at high temperatures under shear. Such method involves two successive stages of over-polymerization, the first of which is a latex-style over-polymerization wherein small latex particles of a vinyl chloride resin are given a coating of specified thickness of the gelled polyacrylate and the second of which is an over-polymerization in aqueous medium wherein the first stage rubber-coated seed resin particles are encased in a hard vinyl chloride matrix resin. The products of such a method contain the tough, rubbery polyacrylate as a more or less continuous network evenly distributed through the hard matrix resin. Such copending application contains references to the prior art use of acrylates in rigid resin formulations.

In the copending application of Eugene J. Sehm, Ser. No. 673,055, now U.S. Pat. 3,644,576 and the copending joint application of Eugene J. Sehm and Elmer J. DeWitt, Ser. No. 672,982, now U.S. Pat. 3,632,679 both filed Oct. 5, 1967, there is disclosed blends of a vinyl chloride resin and a tough, rubbery, essentially completely-gelled alkyl acrylate polymer. Such blends are shown in such applications to be prepared by adding the tough polyacrylate to the resin as highly gelled latex particles either by masticating loose crumb-like forms of the polyacrylate with the resin, by blending resin and polyacrylate latices and coagulating or spray-drying the resulting blended latices, or by over-polymerizing the vinyl chloride resin on a polyacrylate latex.

BACKGROUND OF THE INVENTION

It has been known for some time that polystyrene and polyvinyl chloride resins are highly incompatible. Mill-mixed mixtures of these two resins, no matter how combined and/or compounded usually have little physical integrity and, moreover, produce products of high opacity and which show flex-crazing when bent. Likewise, mill-mixed blends of rubbery polyacrylates and hard vinyl chloride resins usually exhibit poor properties and high opacity unles the polyacrylate is very, very finely dispersed in the vinyl chloride resin such as a disclosed by my above-mentioned copending application.

SUMMARY OF THE INVENTION

I have discovered that blends of an insoluble or cross-linked styrene copolymer resin, a gelled, rubbery polyacrylate, and a hard vinyl chloride resin may be prepared by a method involving two consecutive steps of over-polymerization, the first of which is an over-polymerization in aqueous dispersion containing preformed small seed resin latex particles of the crosslinked (insoluble) styrene copolymer averaging from about 200 to about 1700 A., more preferably from about 350 to about 1300 A., and most preferably from about 350 to about 800 A. in diameter, wherein the seed latex particles are given a coating of the rubbery, gelled polyacrylate averaging from about 25 to 500 A. in thickness, more preferably from about 100 to about 400 A. for best impact. A grafted shell from about 25 A. to about 90 A. on seed particles ranging from about 200 to about 800 A. produces a clear low haze high impact formulation.

The clear versions of the products of this invention are quite critical as indicated above. The diameter of the seed resin particles and the critically-thin shell of gelled polyacrylate are believed to involve a balancing of the higher refractive index of polystyrene ($n_d = 1.590$) against the lower refractive index ($n_d = 1.474$) of the polyacrylate to obtain an average refractive index about equal to that of the hard vinyl chloride matrix resin ($n_d = 1.537$). In such clear compositions, the weight ration of rubbery polyacrylate/seed is about 0.84+10 to 15%. Also, as indicated above, for both clarity and high impact at these very low ratios of rubber:seed, grafting between the seed and the rubber overcoat is essential.

The shell thickness values recited above for the first stage polymerization product, on a percent by total weight basis, correspond to the deposition on the seed particles of between about 8% and about 98% wt. of the gelled acrylate copolymer for the 25 to 500 A. range of shell thicknesses on 200–1700 A. seed, more preferably between about 4% and about 48% wt. for the 25–90 A. range of shell thickness in the clear version on the 200–800 A. range of seed resin particles.

The second stage polymerization products are useful per se as an impact modifier product for vinyl chloride resins and can be sold as such. The proportions of hard over-polymerized vinyl chloride matrix resin in such product is not especially critical except that at least about 35%/wt. of the resin based on the weight of rubber-coated seed resin solids is required to produce a non-sticky product which can be handled without agglomeration. The maximum proportion of such over-polymerized matrix resin can be that desired in the final blend, namely, from about 94% to about 97%/wt. based on the total weight of seed resin plus matrix resin and from about 3 to about 6%/wt. of the gelled acrylate copolymer. More preferred, however, is a second stage product containing from about 35% to about 300%/wt. of over-polymerized matrix resin based on the weight of the rubber. Stated another way, the second-stage product on a total weight basis will constitute from about 3% to about 65%/wt., more preferably from about 10% to about 25%/wt. of the rubbery gelled acrylate copolymer and from about 97% to about 35%/wt., more preferably from about 90% to about 75%/wt., of the total seed and matrix resins. The preferred clear version will, in the second stage, contain from about 3% to about 25%/wt. of the polyacrylate on a total weight basis. Most preferred for high impact strength is a product containing 10 to 20%/wt. of the rubbery acrylate and 90 to 80% of total seed matrix resins. The latter products can be diluted with from about 3 to almost 6 times their weight of rubber-free vinyl chloride resin to produce final blends containing 3–6 parts/wt. of the rubery network phase per 100 parts/wt. of total resin content (hereinafter "phr.").

The tough, rubbery, gelled acrylate copolymer phase is present in over-polymerized second stage product as a more or less continuous network which undoubtedly is altered, stretched, and redistributed to some extent when the composition is masticated under high shear at elevated temperatures. The over-polymerized product per se containing such a network-like dispersion in grafted form does not possess impact strength but develops it after high temperature mastication to a uniform, homogeneous, fluxed and fused condition.

The level of mastication or amount of working required to fully develop the best properties of impact strength and clarity in the compositions of this invention is not susceptible of precise definition. However, a repeatable operative amount of working can be described with reference to one standard processing machine and procedure as an aid to one skilled in the processing of plastics in judging how to process the composition in other forms of processing equipment. Such a machine is the standard two-roll differential laboratory plastics mill having oil-heated rolls 4-inches in diameter rotating 15/20 r.p.m. If the rolls of such machine are maintained at any temperature in the range of from about 350° F. to about 440° F., more preferably between about 375° and about 420° F. and the stock masticated for 2 to 5 minutes after sheet formation with repeated back and forth cutting of the stock, there will be produced excellent high impact compositions of either the clear or hazy types depending on the shell/seed weight ratio and size parameters defined above. During such mixing procedures, the actual temperature of the stock will be somewhat higher than that specified above for the rolls due to frictional heat build-up.

The processing temperatures thus specified are somewhat higher than has been conventional with prior known vinyl chloride resin/rubber blends and certainly considerably higher than has been employed with styrene resins. This high temperature processing is not deleterious to the compositions of this invention because of the great tenacity with which the plastic blend retains its impact strength, rather such high temperature processability enables the compositions of this invention more fully to utilize the higher temperature, higher speed forms of extruders, vacuum forming, injection molding machines, etc.

DESCRIPTION OF THE INVENTION

General

By the term "rigid" as applied to the products of this invention means a product having an HDT or ASTM heat distortion temperature above room temperature (i.e. above 25° C.) and preferably above about 50° C. Rigid vinyl chloride resin compositions usually have tensile strength above about 4500 lbs./sq. in. whereas semi-rigid and flexible formulations usually have lower tensile strength. Flexible resin formulations are not ordinarily thought of in terms of their impact strength since their ready extensibility and flexibility make it difficult to determine their Izod impact value.

By the term "rubbery" as respects the polyacrylate ingredients is meant an elastomeric nature by means of which the polyacrylate is capable of being elongated by at least 100% and which when released will return essentially to its original length.

By the terms "crosslinked." "insoluble" or "gelled," as applied to the styrene copolymer seed resin, is meant a material which does not dissolve, or swell appreciably, in liquid monomeric acrylates or in liquid monomeric vinyl chloride monomer.

By the terms "essentially completely gelled," "essentially insoluble" or "highly gelled," as applied to the rubbery polyacrylate ingredient, is meant a material which per se exhibits a solubility in toluene at room temperature (25° C.) of less than about 20%/wt. Stated another way, one can extract less than about 20%/wt. of the rubber by extraction at room temperature with toluene employing an ultra-centrifuge technique. A preferred polyacrylate evidences such a solubility in toluene at room temperature to the extent of less than about 10%, most preferably below about 5%/wt., and most commonly below about 3%/wt. It is not practical to employ the "sol-gel" Soxhlet-type of extraction procedure common in the synthetic rubber industry to determine the soluble fraction of such a highly insoluble rubber because the screens of the Soxhlet extraction cups ordinarily do not retain microgels. Rather, it is necessary to disperse the rubber in toluene for a period of time and then separate the liquid from the total gel (macro-gel and micro-gel) in an ultra-centrifuge and calculate the percent solubles based on the soluble solids content of the recovered liquid.

It is implicit that such tough, rubbery polyacrylates must be prepared without significant proportions of polymerization modifiers or chain-terminators such as alkyl mercaptans in order to obtain such a highly insoluble polymer.

By the terms "polymerization in aqueous dispersion" or "over-polymerization in aqueous dispersion" is meant a latex-style polymerization of monomeric material emulsified or colloidally-dispersed in water. Such a polymerization usually employs a water-soluble catalyst such as potassium persulfate and one or more water-soluble dispersing agents such as sodium benzene sulfonate, sodium dodecylbenzene sulfonate, sodium lauryl sulfate, sodium laurate, etc. As applied to an "over-polymerization in aqueous dispersion," as in steps 1 or 2 of the process of this invention, the term means a polymerization in aqueous dispersion which proceeds by deposition of polymer on seed resin latex particles to the substantial exclusion of new particle initiation and without coagulation of latex particles to produce a ltex of uniform particle size and free of coagulum in which the original seed resin particles are present coated with the over-deposited polymer.

The term "over-polymerization in aqueous suspension" as respecting the alternate modes useful in the second stage of the process means a polymerization which commences either in the presence of latex particles or of a suspension of fine polymer crumbs containing latex particles and proceeds with the gradual disappearance of the original latex or crumb phase and the appearance of a suspension of macro-granular resinous particles which readily settles out on standing and which is easily filtered to separate solid and liquid phases. Such a polymerization requires (1) a catalyst appreciably soluble in the monomer phase but exhibiting relatively little solubility in water, thereby to suppress new particle initiation in the aqueous phase, and (2) a colloidally-active polymerization suspension agent such as polyvinyl alcohol to stabilize the granular suspension as it forms and eliminate agglomeration and solids deposition.

In the description to follow, there will be recited average diameters of latex particles expressed in A. Such sizes are as calculated based on a standard soap titration determination. Likewise, "shell thickness" values for the polyacrylate coating on the seed resin latex particles are as similarly calculated based again on standard soap titration values and subtracting the original average radius of the seed resin latex particles from the radius calculated for the average rubber-coated particle to arrive at a calculated "shell thickness value." Such calculation of particle sizes and shell thickness values are based on assumed perfectly spherical latex particle all of the same average size, which they are not, and therefore such calculated values are believed not absolute accurate. However, within a series of closely similar latices, such sizes so determined are believed reasonably related to actual sizes. Such errors as may be present, however, appear to be consistent. The relative seed particle sizes and coating thicknesses thus determined are useful in preparing the seed resins and in defining the proportion of the polymers required for the development of impact strength, clarity, and the most efficient use of the rubbery phase in the products of this invention.

Seed resin latices

This starting ingredient employed in the first-stage of the process of the present invention is prepared from a monomeric material which is free of conjugated unsaturation and which consists of at least 80%/wt. of styrene and not more than a total of about 20%/wt. of other monomers including the crosslinking monomer, that is up to about 19.57/wt. of one or more monovinylidene monomers (i.e. those containing a single $CH_2=C<$ group per molecule) copolymerizable with styrene in aqueous dispersion, and from about 0.5% to about 8%/wt., more preferably from about 1% to about 4%/ wt. of one or more non-conjugated polyfunctional crosslinking monomers which contain at least two polymerizable $CH_2=C<$ groupings per molecule.

The resulting crosslinked styrene copolymer produced from such monomers must be essentially insoluble and essentially non-swellable in both liquid monomeric alkyl acrylate esters and in liquid monomeric vinyl chloride, these being the principal monomeric materials to which the seed particles are exposed in the 2-step process. If such seed resin particles are soluble or swellable in such monomers to any extent, they will be destroyed and/or so badly distorted in the subsequent over-polymerization steps as possibly to alter most unpredictably the state of dispersion of the gelled acrylate copolymer ingredient and render the development of impact strength and especially clarity uncertain.

Best seed resin latices are achieved with a two-component monomeric mixture consisting of styrene and 1 to 4% of the crosslinking monomer.

Monovinylidene monomers which may be copolymerized in small proportions with styrene and the crosslinking/grafting monomers to produce seed resin particles include monomers methyl methacrylate, vinyl chloride, vinylidene chloride, acrylonitrile, methyl acrylate, vinyl acetate and many others.

Crosslinking monomers

Nearly any monomeric material which is free of conjugated unsaturation and contains at least two $CH_2=C<$ groupings per molecule may be employed to crosslink and insolubilize the styrene seed resin. Divinyl benzene, divinyl naphthalene, p,p′-divinylbiphenyl, p,p′-diisopropenylbiphenyl, the vinyl cyclohexenes and other polyvinyl and polyallyl-substituted hydrocarbons are relatively inexpensive and available materials known to be good crosslinking agents for styrene. Fusible, soluble, low molecular weight homopolymers of divinyl benzene and soluble 1,2-polybutadienes high in side chain vinyl groups may also be employed. Another important class of cross-linkers are monomeric esters and polyesters of an unsaturated acid and a polyhydric alcohol including unsaturated alcohols which esters and polyesters contain from 2 to 6 $CH_2=C<$ groupings per ester molecule. One subclass of very active ester-type cross-linkers are the monomeric polyesters of acrylic or methacrylic acid and a polyhydric alcohol such as any of the alkylene glycols including ethylene glycol diacrylate (referred to hereinafter as "DEGDA," a preferred cross-linker), ethylene glycol dimethacrylate, trimethylene glycol diacrylate, butylene glycol diacrylate, and others, acrylic or methacrylic polyesters of other polyhydric alcohols such as trimethylol propane triacrylate, trimethylol propane trimethacrylate, glyceryl diacrylate, and many others; allyl acrylate, allyl methacrylate, diallyl maleate, diallyl phthalate, and many, many others.

Another preferred type of cross-linking monomers having little or no graft-inducing propensity are the polyalkenyl polyethers of polyhydric alcohols which contain from 2 to 6 of the alkenyl ether groups each in the terminal or vinylidene structure $CH_2=C<$. Such polyether monomers are produced, for example, by the Williamson synthesis wherein a suitable alkenyl halide such as allyl bromide or vinyl bromide is reacted with an alkaline solution of a polyhydric alcohols derived from sugars and related carbohydrates such as sucrose, maltose, fructose and the like. A particularly effective and available monomer of this class having demonstrated cross-linking ability is a polyallyl ether of sucrose containing an average of 2, 3, 4 or more allyl groups per sucrose molecule.

Grafting/crosslinking monomers

For the clear versions of the compositions of this invention, the cross-linking monomer should have the ability not only to insolubilize the styrene copolymer but also the ability to only partially react during polymerization of the styrene leaving at least a few unreacted polymerizable groupings on the surface of the seed resin particles available as sites for grafting. Such monomers, in general, contain at least two dissimilar polymerizable groupings which demonstrate different reactivities toward styrene during polymerization. One class of such monomers are the vinyl and allyl esters of unsaturated carboxylic acids and unsaturated acid anhydrides and their amides illustrated by allyl methacrylate in which the allyl alcohol group

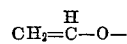

appears materially slower to polymerize with styrene than the alpha-methyl-substituted vinylidene group

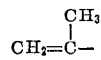

of the methacrylic acid portion of the ester. Still other monomers of this class include vinyl acrylate, vinyl acrylate, vinyl methacrylate, allyl acrylate, diallyl itaconate, the mono-allyl and diallyl maleates, the mono-allyl and diallyl fumarates, diallyl diglycollate, allyl acrylamide, diallyl acrylamide, allyl methacrylamide, allyl crotonate, cinnamyl acrylate, crotyl acrylate, crotyl methacrylate, and others. Allyl methacrylate is a preferred crosslinking/grafting monomer for the preparation of clear, high impact products.

Procedure: The seed resin latex is prepared by polymerizing the monomeric materials described in aqueous dispersion employing water-soluble peroxygen catalysts such as potassium persulfate or water-soluble redox catalyst combinations such as potassium persulfate/sodium bisulfite combinations, etc., and water-soluble dispersants such as benzene sodium sulfonate, sodium dodecylbenzene sulfonate, sodium lauryl sulfate, sodium laurate, and the like all as is well known in the art. The proportion of monomer, catalyst and dispersant added at the start of the reaction will determine the number of particles initiated. Dispersant coverage control (i.e. incremental or continuous addition of dispersant) and/or incremental or continuous monomer addition during the course of the polymerization reaction will assist in suppressing the continued initiation of new particles and insure narrower particle size distribution by means of growth of the once-formed latex particles to the desired size.

The polymerization of the styrene-containing monomeric material may be carried out with agitation at any temperature in the range of from about 20° C. to about 80° C., more preferably between about 35° and about 65° C. Such polymerization should be carried to as high as conversion as possible to simplify residual monomer removal and insure maximum insolubility in the seed particles.

Following completion of the polymerization of the styrene-containing monomeric material, the seed latex should be stabilized, if necessary, by addition of dispersing agent for more complete dispersant coverage and then stripped under vacuum to lower the unreacted monomer content to as low as possible.

Before stripping the seed latex it is desirable to heat the latex to 80–95° C. for 10 to 30 minutes to destroy the residual catalyst content of the seed latex to avoid continued polymerization during monomer recovery operations. As a last step, it is desirable to filter the seed latex to remove any large particles or coagulum floating in the latex.

The styrene copolymer seed resin latices should be prepared at low to moderate solids levels of 15 to 50%/wt., more preferably from about 15 to about 35%/wt., to avoid high latex viscosities.

FIRST STAGE OVER-POLYMERIZATION

Monomeric mixture polymerized

In this stage, there is employed a monomeric mixture consisting of (1) not less than about 80%/wt. of an alkyl acrylate in which the alkyl group contains 2 to 8 carbon atoms, (2) up to about 19.5%/wt. of one of more monovinylidene monomers (i.e. those containing a single CH=C< group per molecule) copolymerizable with the alkyl acrylate in aqueous dispersion, and (3) from about 0.5% to about 8%/wt., more preferably from about 1% to about 4%/wt., of a non-conjugated crosslinking monomer containing at least two $CH_2=C<$ groups per molecule.

The alkyl acrylate monomer may be ethyl acrylate, propyl acrylate, n-butyl acrylate, isobutyl acrylate, n-hexyl acrylate, 2-ethylhexyl acrylate and others. More preferred are the 2 to 4 C acrylates. Most preferred is n-butyl acrylate. Polymers of methyl acrylate are not sufficiently rubbery and polymers of the alkyl acrylates in which the alkyl group contains more than 8 carbon atoms also lack rubberiness. It is preferred to employ two-component mixtures of the acrylate and crosslinking monomers.

The monovinylidene monomers (2) which may be employed in small amounts include vinyl acetate, vinyl chloride, vinylidene chloride, acrylonitrile, methyl methacrylate, styrene, alkyl acrylates in which the alkyl group is methyl or contains more than 4 carbon atoms such as 2-ethylhexyl acrylate, vinyl ethyl ether, vinyl ethyl ketone, acrylamide, 1-monoolefins such as ethylene, propylene, n-butene, 2-ethyl-hexene-1, and others.

Suitable crosslinking monomers for the acrylate ester include the preferred classes or subclasses (a) monomeric polyesters of a polyhydric alcohol and of acrylic or methacrylic acids containing from 2 to 6 polymerizable acrylic acid groups per polyester molecule and (b) monomeric polyalkenyl polyethers of polyhydric alcohols containing from 2 to 6 polymerizable alkenyl ether groups per polyether molecule, both as described above in connection with the seed resin latex.

The monomeric acrylic polyesters and monomeric polyalkenyl polyether compounds polymerize smoothly with alkyl acrylate monomers and appear to enter the copolymer chain in a uniformly random manner and at a frequency apparently determined largely by their concentration in the monomeric mixture. Their use in low concentration such as are described above leads to no tightly gelled or rigid three-dimensional networks which could show up as hard lumps or discontinuities in the final blend.

Procedure: In the first stage over-polymerization, the seed resin latex described above, the acrylate monomeric material defined above, and the usual polymerization adjuvants and their proportion selected to favor polymerization of the monomers on the dispersed seed resin particles to the substantial exclusion of new particle initiation (i.e. low emulsifier coverage as is disclosed in U.S. Pat. 2,520,959 which patent disclosure is incorporated by reference herein) are combined and the polymerization is effected in a closed vessel at any temperature in the range of from about 20° to about 100° C., more preferably from about 35° to about 70° C., and the reaction continued until essentially all of the monomeric material has been converted to polymer. If any polymerization fails to reach at least about 95% to 98% conversion, then the first stage latex product should be heated to 90° to 100° C. to destroy the catalyst and stabilize the polymer, and its unreacted monomer content stripped off by distillation under vacuum. Since the first stage latex product is made with low dispersant coverage, in commercial operation it may be desirable to add more dispersant after polymerization is complete to stabilize the finished latex during stripping, storage and handling.

Where the first stage latex product must be stored for a period of time before use in the second stage polymerization, it is best to heat the latex as described above to 90° to 100° C. for a period of 30–60 minutes after completion of the reaction to destroy the residual catalyst.

An alternative procedure for use in commercial operations employing large reaction vessels where agitation efficiency may be low, it is sometimes preferred as a last step in stage 1 to coagulate the first stage latex product thereby producing a fluid suspension of fine granules or loose crumbs of polymeric material in water for use in the second stage polymerization. Such coagulation is effected by adding a dilute aqueous solution of a salt-type coagulant while agitating the mixture. Best results from the standpoint of the production of finer suspension particles and the least harmful electrolytic contamination of the final product is to employ as a cogulant a dilute solution of alum (aluminum sulfate) in water.

SECOND STAGE POLYMERIZATION

Monomeric materials polymerized

In this stage, there is utilized a monomeric material consisting of not less than about 90%/wt. of vinyl chloride and not more than about 10%/wt. of one or more monovinylidene monomers copolymerizable in aqueous dispersion or aqueous suspension with vinyl chloride. The monovinyl-comonomers may include such monomers as vinylidene chloride, styrene, acrylonitrile, methyl methacrylate, 1-olefins such as ethylene, propylene, n-butene and others, and many others. It is preferred, however, to employ vinyl chloride only as a monomer since the homopolymer polyvinyl chloride is the best and most economic rigid resin matrix in the compositions of this invention.

Procedure: The second stage over-polymerization can be, except for change in monomeric material, carried out in the same manner as the first stage over-polymerization. To do this, the first stage product containing rubber-covered latex particles is diluted with water and additional water-soluble dispersant and a water-soluble catalyst added thereto under conditions approximating that employed in the first stage polymerization in order to insure latex particle growth at the expense of new particle initiation. The principles of U.S. Pat. 2,520,959 is also applicable here. In such a procedure polymerization in aqueous dispersion ensures with the production of a more or less stable latex which is then coagulated to form a suspension of macro-granular polymeric product which is either worked up as such or first blended with a suspension of virgin (i.e. rubber-free) vinyl chloride resin, the resulting blended suspension filtered and the filter cake washed with water, and the resin blend dried, preferably in an air or vacuum oven or in an air suspension drier operating at 200° F. or lower.

A much preferred procedure in the second stage is to employ either (1) a suspension over-polymerization wherein the first stage latex product is combined with water, a monomer-soluble peroxygen catalyst such as isopropyl peroxy percarbonate, benzoyl peroxide, and others, such catalyst preferably being dissolved in the vinyl chloride monomer, and a colloidally-active suspension polymerization stabilizer such as polyvinyl alcohol, sodium polyacrylate, glue, gelatin or bentonite clay and polymerization effected with the gradual disappearance of the latex phase forming directly a suspension of a macro-granular product or (2) as indicated above, convert the first stage latex product by coagulation to a suspension of fine granules or crumbs in water and then add monomer, monomer-soluble catalyst, and colloidally-active suspension agent, and carry out a suspension-on-suspension polymerization.

In either of the alternative preferred procedures it is usually preferred as indicated to dissolve the monomer-soluble (vinyl chloride soluble) peroxygen catalyst in the second stage monomeric material before the latter is added to the polymerization vessel, thereby eliminating the possibility of an inhibition period while the suspended monomer absorbs a separately-added catalyst. Likewise, the suspension agent preferably is dissolved or dispersed in water and the resulting solution added to the liquid reactor, just before monomer addition.

As in all stages of the process, the polymerization is carried out in a closed vessel with the usual precautions of purging the oxygen content of the reactor before addition of materials. The second stage polymerization is effected at any temperature between about 20° and about 75° C., more preferably between about 40° and about 60 C. and the polymerization is continued, as is conventional for vinyl chloride resins, until about 60% to about 80% of the total vinyl chloride monomer has been converted to polymer (i.e. to pressure drop). The polymerization temperature, monomer concentration and catalyst concentration are selected to produce a resin deposit of the desired molecular weight, but see more about this below. The last step in the second stage polymerization preferably is addition of a polymerization shortstop and the removal of unreacted monomeric materials.

It is usually desirable that the polymerization reaction in the second stage be terminated by addition of a polymerziation short-stop or catalyst killer in order to prevent continued polymerization during removal of residual monomers and subsequent handling. For this purpose, a dilute solution of "bisphenol A" (p,p'-isopropylidene diphenol) in methanol has been found especially useful since this shortstop material is non-discoloring and does not impart odor to the final resin.

FINAL BLEND PREPARATION

The macro-granular product obtained as the final product of the second stage polymerization will contain from 3% to 65%/wt., more usually from about 10% to about 25%/wt. of the polyacrylate ingredient. I have found surprisingly that such second stage product can be diluted with vinyl chloride resin not containing a rubber phase to produce a final blend having an average concentration of polyacrylate from about 3 to about 6 phr. Such final blend needs be fluxed, fused and masticated under fairly intensive shear employing a mixer apparatus having its metal surfaces in contact with the plastic maintained at a temperature somewhat above what has been the practice with most rigid vinyl chloride resins, i.e. between about 350° and 440° F., more preferably between about 375° and 420° F. Stock temperatures will usually be slightly higher during such mechanical working.

The blending of the second stage product with additional resin can be carried out in any convenient manner. Dry resins may be powder blended in an internal mixer and the powder blend transferred to a two-roll plastics mill having its rolls maintained at the temperatures indicated for the final fluxing under shear at high temperatures.

A better procedure for a resin manufacturer is to blend the final second stage aqueous suspension of masterbatch product with a like suspension of virgin vinyl chloride resin not containing a rubber phase. The blended suspension may then be filtered, washed and dried and, finally, masticated as indicated. The latter preferred blended suspension prepared in this way has the added advantage of being easier to dry than the undiluted second stage product, per se, which is substantially non-porous. Also, the polymer manufacturing plant from one charge of second stage suspension may make up a number of polymer blends for various purposes containing various different dilution resins and also containing any proportion of rubber phase within the 3–6 phr. range. Likewise, the second stage granular product can be isolated for sale per se to resin customers as an impact additive for vinyl chloride resins who will perform the final dilution during their regular resin formulation procedures preferably employing powder blending equipment.

The blends of this invention require the addition of the usual vinyl chloride resin stabilizers and in the usual proportions. I have found that organo-tin types of stabilizers such as dibutyl tin diglycollate such as "Thermolite 31" (TM, Metal and Thermit Corporation) or dibutyl tin dilaurate are superior in these formulations.

TEST PROCEDURES

In the examples below, a mill-mixed stock in sheet form prepared as described above is usually preheated to a temperature 10° F. above its milling temperature and molded for 3 minutes in an ASTM standard tensile sheet mold maintained at the preheat temperature under 30,000 lbs. pressure. The resulting press molded sheet is cooled in the mold and the ASTM Izod impact strength (ASTM No. D256–56, Method A) determined on ⅛-inch specimens prepared from the molded sheet. In some cases, the ASTM Heat Distortion Temperature ("HDT") is also determined on specimens prepared from the press molded tensile sheets employing ASTM Procedure No. 648–56 at 264 p.s.i.

VINYL CHLORIDE RESINS

The nature of the final blend and especially its flow or melt properties may be varied to some extent by varying the molecular weight of the over-polymerized second-stage vinyl chloride matrix resin and/or that of the resin added as diluent resin. For example, polyvinyl chloride resins having inherent viscosities (ASTM D1243 employing 0.2 gram of resin in 100 ml. of cyclohexanone at 30° C.) of from about 0.90 up to about 1.15 form blends which are exceptionally hard, very rigid and useful in structural applications where maximum resistance to deformation by heat is required. Polyvinyl chlorides of this same range of molecular weight also produce final blends having flow properties enabling their use in extrusion and plastics roll-forming and vacuum forming operations. Polyvinyl chlorides having inherent viscosities between about 0.50 and about 0.80 form compositions having somewhat higher flow rates which are useful in injection molding.

OTHER INGREDIENTS

If desired, still other compounding ingredients may be added either to the second stage granular product or to the final diluted powder blend composition. In addition to resin stabilizers there may be added small proportions of colorants, fillers, pigments, opacifiers, lubricants, processing aids, and still other conventional rigid resin compounding ingredients. Resinous processing aids may be employed but are not required for good processability in commercial equipment. The following specific examples are intended as being illustrative only and not as limiting the invention in any way.

EXAMPLE I

In this example, the nature of the tough, rubbery, essentially completely-gelled polyacrylate will be demonstrated by tests performed on several samples of gelled polyacrylates made by the procedures of this invention but without seed resin and vinyl chloride resin in order to produce a pure, gelled polyacrylate suitable for examination.

A monomeric mixture of n-butyl acrylate containing about 3% wt., based on the total mixture of diethylene glycol diacrylate ("DEGDA") as a crosslinking monomer is polymerized in aqueous dispersion utilizing a reaction medium having the following composition:

| Material: | | Parts/vol. or parts/wt. |
|---|---|---|
| Water | ml | 2100 |
| $K_2S_2O_8$ | gram | 1 |
| $K_2S_2O_5$ (5% aq. sol.) | ml | 10 |
| $Na_2S_2O_4$ (1% aq. sol.) | ml | 2 |
| n-Butyl acrylate | grams | 1250 |
| "DEGDA" | do | 38.5 |
| Emulsifier solution [1] | ml | 55 |

[1] "Siponate DS10" (10%/wt. aq. sol.), an emulsifier made by Alcolac Chemical Corporation and said to be a purified form of dodecyl benzene sodium sulfonate.

The above medium is prepared by first combining the water and $K_2S_2O_8$ in closed, stirrer-equipped reaction vessel from which oxygen had been purged or displaced by pure nitrogen. The stirrer is started and heat applied to heat the liquid to about 40° C. at which point the $K_2S_2O_5$ solution is injected. The n-butyl acrylate and DEGDA vessel begun in a portionwise manner, the rate of such are premixed and addition of the mixture to the reaction addition being controlled at a rate to hold the temperature of the liquid in the range of 38°–40° C. After the addition of some 60 ml. of monomers over the first 40-minute period, a 1 ml. portion of the $Na_2S_2O_4$ solution and a 1 ml. portion of the emulsifier solution are added. Polymerization is continued with periodic additions of the same liquids in this manner over a 7½ hour reaction period wherein about 1 ml. of emulsifier solution is added for every 20 ml. of monomeric mixture.

After all materials have been added, stirring is continued for an additional one-half hour while applying heat to hold the liquid contents at 38°–40° C. The reaction mixture is then allowed to cool and the reaction vessel opened to reveal a fluid latex. Such latex is stripped of its unreacted monomers by vacuum distillation. There is obtained a final yield of 3,223 grams of a stable latex containing 36.1%/wt. of total solids.

A portion of the latex is coagulated by mixing with about 3 volumes of methanol and the resulting rubbery crumbs dried in a vacuum oven at 50° C. The dry crumbs are so tough and elastic that they resemble a vulcanized rubber. A portion of the crumbs is disintegrated into small pieces and added to a sealed container containing toluene. The container and its contents are rolled on paint mixing rolls overnight at room temperature. The liquid contents are ultra-centrifuged at 30,000 r.p.m. to obtain a solid-free liquid. The total solids content of an aliquot portion the solid-free liquid is determined by evaporative heat-loss and the total solubility of the original dry crumbs calculated. The solubility of the gelled butyl acrylate copolymer determined in this manner is very low, being of the order of only about 1.3% wt.

A mixture of ethyl acrylate and about 3%/wt. of DEGDA is polymerized employing a similar procedure and materials. The coagulated dry crumbs obtained from the resulting latex are likewise rubbery, tough and elastic. They are found to have a solubility in toluene at a room temperature of only about 2%/wt.

Example 2

In this example, a representative recipe and procedure for the preparation of the crosslinked insoluble styrene copolymer seed latex is given and the resulting seed resin latex employed in the method of this invention to prepare high impact, rigid polyvinyl chloride compositions.

PREPARATION OF SEED LATEX

Recipe

| Material: | | Parts/vol. or parts/wt. |
|---|---|---|
| Water | g | 600 |
| $K_2S_2O_8$ | mg | 300 |
| $K_2S_2O_5$ | mg | 75 |
| Dispersant [1] (10%/wt. aq. sol.) | g | 8 |
| Styrene (pre-mixed) | g | 300 |
| DEGDA (pre-mixed) | g | 6.0 |

[1] Same as Example 1.

A 2-liter glass reactor provided with a stirrer operating at 300 r.p.m. is first purged with nitrogen and then the water, $K_2S_2O_8$, $K_2S_2O_5$, and 22 ml. of the dispersant or emulsifier solution added, the stirrer started and heat applied until the liquid reaches 55° C. When the catalyst solids are observed to have dissolved, 34 ml. of the pre-mixed monomers are added. In 10 minutes polymer appears and when the temperature rises above 40° C., monomer is pumped into the reactor at a rate of about 1 ml./min. to maintain the liquid at a temperature of about 45° C. Periodically 5–10 ml. portions of the dispersant solution are added, the last of which is added after about three hours of reaction time has elapsed. All of the monomer is added by 4 hours and 20 minutes. After all monomer is in, the mixture is stirred for an additional 30 minutes and then heat is applied to heat the latex to 80° C. after which the mixture is allowed to cool. The reactor is then opened and the latex product poured through a cheesecloth filter. Negligible solids are observed on the filter cloth.

Such latex is extracted five times with 200 ml. portions of hexane after which 300 ml. of water are added to the latex and the latex distilled under vacuum (until 300 ml. of water are removed at this point contains 33.6%/wt. of total solids of which 32.6%/wt. is crosslinked styrene copolymer and about 0.97%/wt. of dispersant. A soap titration indicates that the average diameter of the resulting latex particles is 1114 A.

FIRST STAGE OVER-POLYMERIZATION

Recipe

| Materials: | | Composition |
|---|---|---|
| Water | ml | 400 |
| $K_2S_2O_8$ | mg | 250 |
| $K_2S_2O_5$ | mg | 75 |
| Above seed latex polymeric solids | g | 78.5 |
| n-butyl acrylate ⎫ Pre-mixed DEGDA ⎭ | g | 100 |

A 1-liter glass reactor equipped with a 300 r.p.m. stirrer is purged with nitrogen and then the water, 150 mg. of $K_2S_2O_8$, and all of the $K_2S_2O_5$ are added and stirring commenced. When the catalyst materials are dissolved, the seed latex is added and heat applied to heat the liquid to 40° C. Pumping of the premixed monomers to the reactor is then commenced at a rate about at about which it is consumed (i.e. to avoid excess liquid monomer). About 82 ml. of the monomers is thus added over a period of 2 hours and 25 minutes. Stirring at 40° C. is continued after all the monomers are in. After about 6 hours of total reaction time the remaining 100 mg. of $K_2S_2O_8$ catalyst reagent is added and stirring continued overnight for a total of about 22 hours while maintaining the liquid at about 45° C. At the latter point, the heat input is increased to raise the latex temperature to 80° C. After which the heat and the stirrer are shut off and the reactor and contents allowed to cool. The latex is filtered (3 g. of coagulum) (theoretical complete conversion would yield percent TS of 27.9%/wt.) to obtain a yield of 531 g. of latex containing 27.1%/wt.) to obtain a yield of 531 g. latex containing 27.1//wt. of total solids of which 14.5%/wt. is the styrene copolymer seed resin, 12.2%/wt. is gelled butyl acrylate copolymer, and about 0.4%/wt. is dispersant. The shell thickness is 126 A. by soap titration.

SECOND STAGE OVER-POLYMERIZATION

Recipe

| Materials | Parts/vol. or parts/wt. |
|---|---|
| Water | ml 1000 |
| Suspension agent (1% aq. sol.)[1] | ml 50 |
| $K_2HPO_4 \cdot 3H_2O$ | mg 50 |
| First stage latex | g 279 |
| Vinyl chloride | g 400 |
| Catalyst (10%/wt. solution in methanol)[2] | ml 2.5 |

[1] "Methocel HG 65" (TM. Dow Chemical Corp.).
[2] Isopropyl peroxy percarbonate.

A stainless steel reactor of 2665 ml. capacity and fitted with a pressure gauge and a 400 p.p.m. stirrer is purged with nitrogen and then the water, $K_2HPO_4 \cdot 3H_2O$, suspension agent solution, and latex are charged. The stirrer is turned on, the reactor evacuated and the vacuum broken by charging all of the vinyl chloride monomer. Heat is applied to heat the liquid to 52° C. after which the mixture is allowed to stir for about 30 minutes. At the latter point the catalyst solution is injected and the mixture is stirred while maintaining the reaction mixture at 52° C. When the pressure gauge shows a drop in pressure of 5 p.s.i. (which is taken as the point of exhaustion of liquid vinyl chloride monomer), the reactor and its contents are cooled rapidly and the residual monomeric vinyl chloride is vented off. There remains in the reactor an easily-stirred sand-like suspension of macro-granular particles of polymer averaging about 75–100 microns in diameter. Such suspension is filtered, the filter cake washed once with water and once with hot methanol and then dried to constant weight in a vacuum oven at 50° C. A yield of 331 grams of dry product is obtained which contains about 10%/wt. of the gelled butyl acrylate copolymer, 1–2%/wt. of crosslinked styrene seed copolymer, and the remainder polyvinyl chloride.

| | Blending recipe, parts/wt. | | | | |
|---|---|---|---|---|---|
| Sample No | A | B | C | D | E |
| Above product | 74.0 | 57.0 | 48.0 | 28.0 | 0 |
| "Geon 103 EP"[1] | 26.0 | 43.0 | 52.0 | 62.0 | 100 |
| SAN[2] | 2 | 2 | 2 | 2 | 2 |
| Wax | 2 | 2 | 2 | 2 | 2 |
| Stabilizer | 3 | 3 | 3 | 3 | 3 |

[1] TM, B. F. Goodrich Chemical Co., polyvinyl chloride, IV=0.94.
[2] Styrene/acrylonitrile copolymer, processing aid.
[3] Dibutyl tin diglycollate.

The above mixtures are prepared by powder mixing in a Henschel laboratory mixer followed by mill-mixing for 5 minutes at 380° F. The physical properties of press molded ASTM tensile sheets (molded 3 min. @ 390° F.) prepared as described above are as follows:

| Sample No | A | B | C | D | Control E |
|---|---|---|---|---|---|
| Rubber content, phr | 8 | 6 | 5 | 4 | 0 |
| Izod impact | 16.8 | 15.2 | 10.5 | 11.0 | 0.48 |
| Flow rate, 400 lb. load[1] | 8.32 | 9.55 | 10.5 | 11.0 | 5.2 |
| Flow rate, 800 lb. load[1] | 193 | 177 | 188 | 190 | 48 |

[1] Proprietary constant load rheometer procedure at 200° C. and 400 and 800 p.s.i. load; orifice 0.045 inch ID, orifice L/D of 7, expressed as weight in grams of extrudate in 10 minutes.

The fluxed and fused tensile sheets were hazy but of otherwise excellent appearance. All of the compositions exhibit excellent impact strength at very low rubber loadings. Note also the excellent flow properties shown as compared to those of the control composition of Sample E which contains no rubbery, gelled acrylate copolymer. The seeded rubber phase is thus shown not only to be an impact agent but also to be a better processing aid than the SAN resinous processing aid employed in all of the compositions.

Example 3

The procedures of Example 2 are repeated employing a similar seed resin latex containing insoluble styrene copolymer seed produced from a mixture of 150 parts/wt. of styrene and 3 parts/wt. of allyl methacrylate, the seed latex particles averaging 498 A. in diameter and the gelled butyl acrylate copolymer shell thickness of 56 A. to produce a stage 1 and stage 2 products of the following compositions:

STAGE 1 (GRAFTED)

Latex: 32.9%/wt. total solids; 54% wt. of styrene copolymer; 46%/wt. of butyl acrylate copolymer
Latex particles: 610 A. average diameter

STAGE 2

Polyvinyl chloride: 76.4%/wt.
Gelled butyl acrylate copolymer: 10.8%/wt.
Crosslinked styrene copolymer: 12.8%/wt.

Such product is blended according to the recipe of Ex. 2 with "Geon 105 EP" (TM, B. F. Goodrich Chemical Company, polyvinyl chlroide of IV of about 0.74) as to produce final powder blends of 3, 4, 5, 6, 7 and 8 phr. of gelled butyl acrylate polymer. Such powder blends are mill-mixed 8 minutes at 350° F. and press-molded (3' @ 390° F.) into tensile sheets as described above. Izod impact values of such molded sheets are:

| Sample No | A | B | C | D | E | F | G |
|---|---|---|---|---|---|---|---|
| Rubber, phr | 0 | 3 | 4 | 5 | 6 | 7 | 8 |
| Izod | [1]0.5 | 2.2 | 10.9 | 15.6 | 18.6 | 14.4 | 19.6 |
| HDT (ASTM) °C | 63.5 | 66.5 | 67 | 66.5 | 66.5 | | 66.5 |

[1] Average of two samples.

All of the above compositions were very slightly hazy but otherwise clear and of excellent appearance. The Izod impact and HDT values for 3–6 phr. are extraordinarily good at such low levels of rubber phase. The products were very much clearer and less hazy than similar products made without grafting.

Example 4

The procedures and materials of Example 2 are utilized to prepare a product of this invention starting with a crosslinked styrene/DEGDA copolymer seed resin latex made with 1.5 parts/wt. of DEGDA per 100 parts/wt. of styrene and containing latex particles averaging 558 A. in diameter. The gelled 100 butyl acrylate/3DEGDA rubbery copolymer "shell" calculates as 228 A. in thickness and the first stage latex products composition is as follows:

| | Percent/wt. |
|---|---|
| Crosslinked styrene copolymer seed | 3.27 |
| Gelled butyl acrylate copolymer | 24.06 |
| Dispersant | 0.24 |
| Salts | 0.05 |

The second stage product composition is as follows:

| | Percent/wt. |
|---|---|
| Polyvinyl chloride | 71.7 |
| Gelled butyl acrylate copolymer | 24.9 |

The Izod impact values on blends with polyvinyl chloride (IV=0.94) are as follows:

| Sample No. | A | B | C | D |
|---|---|---|---|---|
| Gelled butyl acrylate copolymer content, phr. | 8 | 6 | 5 | 4 |
| Izod, ft. lbs./in. | 20.4 | 19.4 | 18.3 | 2.61 |

It is noted that extruded bars of these compositions are opaque but show very little stress whitening on bending indicating considerably better compatibility between polyvinyl chloride and the acrylate and styrene constituents than is usually observed.

Example 5

The crosslinked styrene/DEGDA copolymer seed resin latex of the immediately preceding example containing particles averaging 558 A. in diameter is employed in the preparation of a second product having a shell thickness of only 65 A. using more seed resin and less acrylate monomers. The second stage polyvinyl chloride overpolymerization is carried out at the same 52° C. as employed in Example 4. The product of this example with the thin shell blended with Geon 103 EP polyvinyl chloride yields blends containing 4–8 phr. of the gelled butyl copolymer which in the form of bars and rods are almost entirely clear whereas the product of Example 4 containing the rubbery acrylate phase as a thick shell produced completely opaque extruded bars or rods. From this it is concluded that the thinner shells of the acrylate rubber are required for clarity. When the blends of this example are compared to those of Example 4 at equal acrylate rubber loadings of 4–8 phr., the product of Example 4 is found to impart somewhat higher impact values throughout the range although the products of this example have impact strengths lower than the product of Example 3 wherein the rubber shell is graft to the seed resin particles. From these data, it appears that for a product which possesses both high impact strength and clarity, grafting and the critical shell-to-seed thickness factors are required.

Example 6

In this example, a somewhat larger particle size seed latex is prepared from a mixture of 300 parts/wt. of styrene and 9 parts/wt. of allyl acrylate employing the general recipes (except for a reduced emulsifier level) and procedures of the foregoing examples. The latex evidences an average particle size of 1324 A. based on soap titration. An n-butyl acrylate (100)/DEGDA(3) mixture is overpolymerized producing a shell thickness of about 181 A. The second stage over-polymerization at 52° C. deposits polyvinyl chloride of fairly high molecular weight producing a final product containing about 14.3%/wt. of the rubber, about 13.5%/wt. of styrene seed resin and the remainder polyvinyl chloride. When blended with Geon 103, blends containing 4 and 5 phr. of the rubber exhibit very high Izod values of 23.1 and 24.6 ft. lbs./in., respectively. With these products in which the rubber is believed to be grafted to the seed, there is some evidence that somewhat higher processing temperatures (420° F.) produces higher impact resistance than does processing at 380–390° F.

I claim:
1. In a method of dispersing a tough, rubbery, gelled alkyl acrylate polymer in a hard vinyl chloride resin to produce an impact modifie rfor rigid vinyl chloride resins, the improvement which comprises the consecutive steps of (1) combining an aqueous seed resin latex containing latex seed resin particles of a crosslinked styrene copolymer insoluble in monomers specified below and averaging from about 200 A. to about 1300 A. in diameter as determined by means of a soap titration procedure, said seed resin latex having been prepared by polymerization in aqueous dispersion of a monomeric material consisting of at least 80%/wt. of liquid monomeric styrene, not more than about 19.5%/wt. of said total monomeric material of one or more monovinylidene monomers copolymerizable in aqueous dispersion with styrene, and from about 0.5 to about 8%/wt. of a nonconjugated crosslinking monomer containing at least two $CH_2=C<$ groupings per molecule, with

(a) a monomeric mixture free of conjugated unsaturation and consisting of (i) at least 80%/wt. of an alkyl acrylate in which the alkyl groups contain from 2 to 8 carbon atoms, (ii) not more than a total of 19.5%/wt. of one or more monovinylidene monomers copolymerizable in aqueous dispersion with said alkyl acrylate, and (iii) from about 0.5% to about 8%/wt. of a crosslinking monomer containing at least to $CH_2=C<$ groups per molecule, (b) selected polymerization adjuvents including a water-soluble peroxygen catalyst and one or more water-soluble polymerization dispersants both in proportions to effect polymerization of said monomeric mixture in aqueous dispersion on said seed resin particles without significant new particle initiation, and (c) water, if required, the resulting aqueous dispersion polymerization medium containing no significant propotrions of chain-terminating polymerization modifiers and effecting polymerization of said (1)(a) monomeric mixture in said medium to form a latex product in which the original seed resin latex particles are coated with a shell of rubbery gelled acrylate copolymer from about 25 A. to about 500 A. in thickness as determined by calculation based on a soap titration procedure, the rubbery, gelled acrylate copolymer of said shell being per se soluble in toluene at room temperature to the extent of less than about 20%/wt. as determined by an ultracentrifuge procedure, and constituting from about 8% to about 98%/wt. of said coated particles, (2) combining said step (1) rubber-coated seed latex particles with (a) a monomeric material consisting of liquid monomeric vinyl chloride and not more than a total of 10%/wt. of one or more monovinylidene monomers copolymerizable with vinyl chloride in aqueous media;

(b) a peroxygen polymerization catalyst, and (c) a polymerization suspension or dispersing agent, and (3) effecting polymerization of said (2)(a) monomeric material in the resulting aqueous medium to produce a polymeric product containing said rubbery acrylate coated seed resin latex particles encased in matrix of hard, vinyl chloride resin, said polymeric product containing from about 3% to about 65%/wt. of its total weight of said rubbery, gelled acrylate copolymer and from about 35% to about 97%/wt. of said hard vinyl chloride resin matrix.

2. The method as defined in claim 1 and further characterized by said step (1) seed resin latex being prepared from a monomeric material consisting of monomeric styrene and between about 1% and about 4% by weight of said nonconjugated crosslinking agent, by said step (1)(a) monomeric mixture consisting of butyl acrylate and from about 1% to about 4% by weight of said crosslinking monomer, and by said step (2)(a) monomeric material consisting of vinyl chloride.

3. In a method of dispersing a tough, rubbery, gelled alkyl acrylate polymer in a hard vinyl chloride resin, the improvement which comprises the consecutive steps of (1) combining an aqueous seed resin latex containing latex seed resin particles of a crosslinked styrene copolymer averaging from about 200 A. to about 800 A. in diameter as determined by means of a soap titration procedure, said seed resin latex having been prepared by polymerization in aqueous dispersion of a monomeric material consisting of liquid monomeric styrene and from about 1% to about 4%/wt. of said total monomeric material of a non-conjugated crosslinking monomer containing at least two polymerizable groupings per molecule evidencing dissimilar copolymerization reactivity toward styrene thereby to leave on the surface at least of said seed resin particles unreacted polymerizable groupings as potential grafting, sites, with (a) a monomeric mixture free of conjugated unsaturation and consisting of (i) n-butyl acrylate and (ii) from about 1% to about 4% wt. of an allyl ester of an unsaturated carboxylic acid, (b) selected polymerization adjuvents including a water-soluble peroxygen catalyst and one or more water-soluble polymerization dispersants both in proportions to cause polymerization of said (1)(a) monomeric mixture in aqueous dispersion on said seed resin particles without significant new particle initiation, and (c) water, if required, the resulting aqueous dispersion polymerization medium containing no significant proportion of chain-terminating polymerization modifiers and effecting polymerization of said (1)(a) monomeric mixture in said resulting polymerization medium to form a latex product in which the original seed resin particles are coated with a grafted shell of rubbery, gelled butyl acrylate copolymer averaging from about 25 A. to about 90 A. in thickness as determined by calculation based on a soap titration procedure, the rubbery, gelled butyl acrylate copolymer of said shell being per se soluble in toluene at room temperature to the extent of less than about 10%/wt. as determined by an ultracentrifuge procedure and constituting from about 44% to about 48%/wt. based on the total weight of said coated particles, (2) combining said step (1) rubber-coated seed latex particles with (a) a monomeric material consisting of liquid monomeric vinyl chloride, (b) a peroxygen catalyst dissolved in said vinyl chloride, and (c) a colloidally-active polymerization suspension agent, and effecting polymerization in the resulting aqueous suspension polymerization medium to produce an aqueous suspension of macro-granular polymeric product containing said rubber-coated seed resin particles encased in a materix of polyvinyl chloride, said polymeric product containing from about 3% to about 25%/wt. of said rubbery, gelled butyl acrylate copolymer.

4. The method as defined in claim 3 and further characterized by said step (1) seed resin latex being prepared from a monomeric material consisting of monomeric styrene and between about 1% and about 4% by weight of allyl methacrylate, by said step (1)(a) monomeric mixture consisting of butyl acrylate and from about 1% to about 4% by weight of a glycol diester of an acrylic acid and by said step (2)(a) monomeric material consisting of vinyl chloride.

References Cited
UNITED STATES PATENTS

| | | | |
|---|---|---|---|
| 3,290,265 | 12/1966 | Kaneko | 260—29.6 |
| 3,448,173 | 6/1969 | Ryan et al. | 260—876 |
| 3,657,172 | 4/1972 | Gallagher et al. | 260—29.6 RB |

JOHN C. BLEUTGE, Primary Examiner

J. SEIBERT, Assistant Examiner

U.S. Cl. X.R.

260—296 RB, 45.75 K, 876 R, 878 R, 880 R, 881, 883

UNITED STATES PATENT OFFICE
CERTIFICATE OF CORRECTION

Patent No. 3,763,279　　　　　　　　　Dated  October 2, 1973

Inventor(s)  PHILIP C. KELLEY

It is certified that error appears in the above-identified patent and that said Letters Patent are hereby corrected as shown below:

Col. 2, line 50, "ration" should read --ratio--; line 51, insert a minus sign under the "+" thusly " $\pm$ "; line 61 "4%" should read --44%--.
Col. 5, line 34 "19.57/wt" should read --19.5%/wt.--.
Col. 6, line 58 delete "vinyl acrylate" first instance.
Col. 11, line 45, 46 and 47 should read --The n-butyl acrylate and DEGDA are premixed and addition of the mixture to the reaction vessel begun in a portionwise manner, the rate of such--.  Lines 46 and 47 were transposed .
Col. 12, line 53 after "removed" insert --) to remove residual monomeric styrene . The latex -- .
Col. 13, lines 15,16 omit duplication ")to obtain a yield of 531 g. latex containing 27.1/wt."; line 31, "--methyl cellulose-- should be added to the footnote "1"; line 35, "p.p.m" should read --r.p.m.--; line 67, second table, after "Stabilizer" insert --3--.

Signed and sealed this 13th day of August 1974.

(SEAL)
Attest:

McCOY M. GIBSON, JR.　　　　　　C. MARSHALL DANN
Attesting Officer　　　　　　　　Commissioner of Patents